649X
Folsom & Hayden,
Washing-Machine,
Patented Dec. 17, 1805.
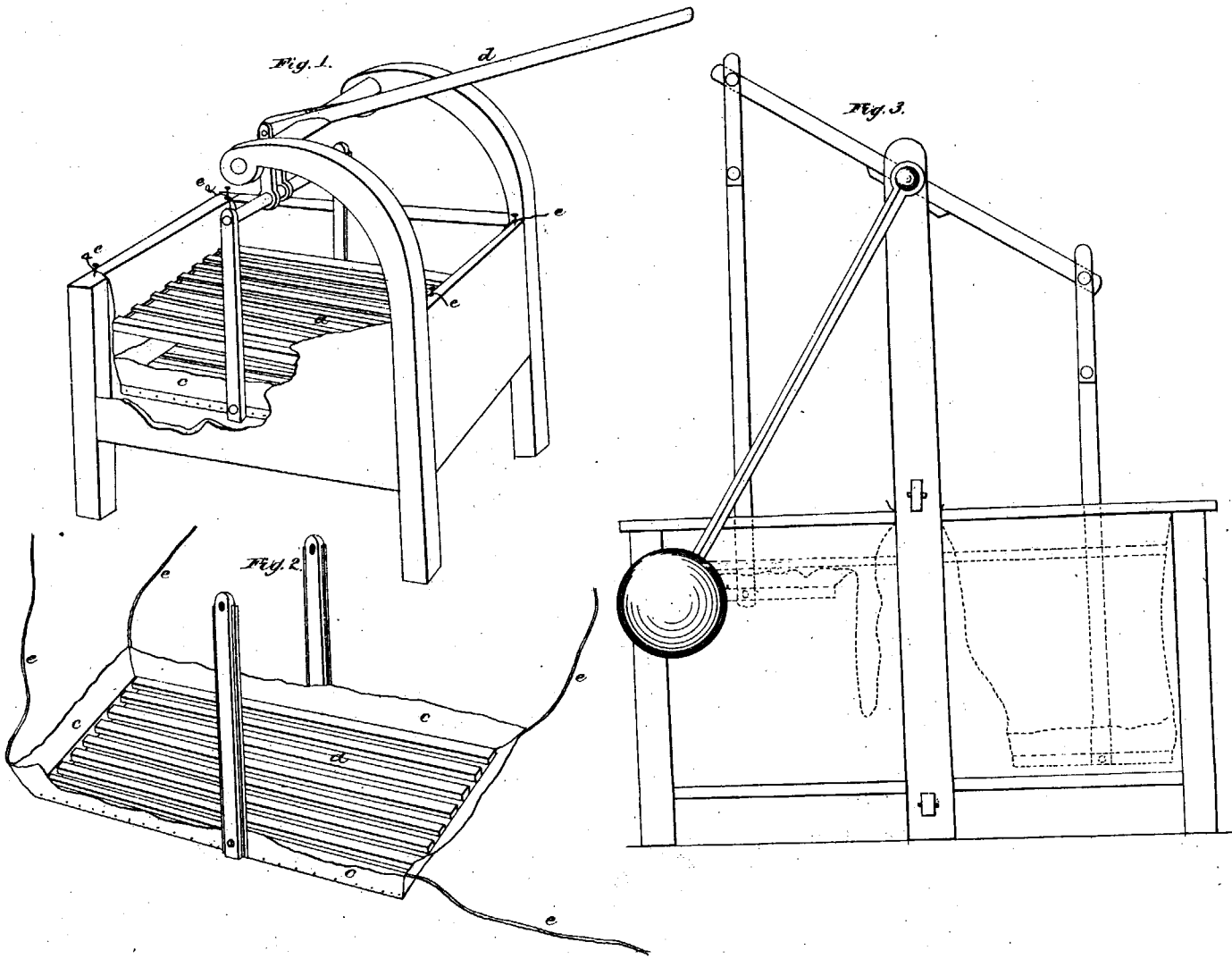
N. PETERS, PHOTO-LITHOGRAPHER, WASHINGTON, D. C.

649X William Johnson Folsom and John Hayden Dec 17, 1805

Letters Patent Issued Dec. 17. 1805.

The Schedule referred to in these Letters Patent and making part of the same containing a descrip-
tion in the words of the said William Johnson Folsom and John Hayden of their machine for wash-
ing rinsing and wringing clothes.

2 [illegible]

This Machine consists of two horizontal grates within a Box or Tub the lower one moveable & the upper one perma-
nent. The moveable grate is carried up and down by a lever purchase which is placed on
a post fastened to the side of the Tub about four feet in height from the floor and bend-
ing over at top within eight inches of the centre of the Tub. This grate has a post fasten-
ed to the two opposite sides of it which run in grooves made in the Tub. They are con-
nected ... at top by a cross bar. From the middle of this Bar goes a joint into the
end of the Lever and is there fastened by a bolt. To this grate a strip of course cloth
eight inches wide is .... fastened around near the edges and held up by strings hook-
ed outside of the Tub. this prevents the cloaths to be washed (which are laid promiscuous-
ly within this Box on this grate) from coming to any wear. The upper grate is
made to go in very loosely and is placed so as to give the lower one room to play up and
down from five to eight inches according to the quantity of Cloaths put in. this has two
short posts on its sides and is fastened to the Tub by bolts.
These grates are made of cross pieces of wood about an inch apart. The Box or Tub is made
two feet in diameter, or less for small families proportioned in height to width to make it
a convenient washing Tub with a tap in the side and standing on legs projecting to make
it steady. and if shallow it requires a cover to lay on.
Upon the same principle two pair of Grates may be made to work in a Box separated
by a partition. and moved by a pendulum. N.B. Great care must be taken
to make the Box or tub true inside. and of wood that will shrink and swell as little
as possible. As also the moveable grate which may sometimes require cork or leather
around the edge to make it true particularly if made circular.

Exd
MG (442 words)